United States Patent [19]

Lamarche

[11] E Patent Number: Re. 32,705

[45] Reissued Date of Patent: Jun. 28, 1988

[54] SERIES VIBRATION DAMPER WITH NON-SYMMETRICAL CURVE

[75] Inventor: Paul E. Lamarche, Utica, Mich.

[73] Assignee: Borg-Warner Corporation, Chicago, Ill.

[21] Appl. No.: 867,715

[22] Filed: May 28, 1986

Related U.S. Patent Documents

Reissue of:

[64] Patent No.: 4,451,244
Issued: May 29, 1984
Appl. No.: 445,610
Filed: Nov. 30, 1982

[51] Int. Cl.[4] ..... F16D 3/14; F16D 47/02

[52] U.S. Cl. ..... 464/68; 192/106.2

[58] Field of Search ..... 464/66–68, 464/81, 62; 192/106.2, 70.17

[56] References Cited

U.S. PATENT DOCUMENTS 2,574,573 11/1951 Libby ..... 464/68
4,188,805 2/1980 Fall et al. ..... 464/64
4,279,132 7/1981 Lamarche ..... 464/64
4,304,107 12/1981 Fall et al. ..... 464/64
4,430,064 2/1984 464 ..... 64/

FOREIGN PATENT DOCUMENTS 1032601 12/1958 Fed. Rep. of Germany .... 64/27 C

*Primary Examiner*—Stuart S. Levy
*Assistant Examiner*—Thomas R. Hannon
*Attorney, Agent, or Firm*—James A. Geppert

[57] ABSTRACT

A series vibration damper assembly which includes a control device that will allow the damper to react differently in the coast direction than in the drive direction. The vibration damper assembly includes a housing having inwardly offset drive straps, a hub having radial arms aligned with the drive straps in a static condition, a plurality of spring separators positioned between the hub arms and separating damper springs received between the hub arms. The improvement of the present invention relates to a curved bypass thrust member secured to each hub arm and projecting through two damper springs and the spring separator to abut the next spring separator and prevent compression of the two springs in the coast direction.

18 Claims, 3 Drawing Sheets

SERIES VIBRATION DAMPER WITH NON-SYMMETRICAL CURVE

Matter enclosed in heavy brackets [ ] appears in the original patent but forms no part of this reissue specification; matter printed in italics indicates the additions made by reissue.

BACKGROUND OF THE INVENTION

It is well known to use a combination spring and friction type vibration damper in a conventional vehicle friction clutch in the drive train between the vehicle engine and the manual transmission therefor. In more recent years with the addition of a lock-up clutch in a torque converter for an automatic transmission to provide direct drive from the vehicle engine to the automatic transmission without the normal slippage found in a torque converter, a vibration damper has been utilized in the lock-up clutch to overcome the undesirable characteristics which would be normally hydraulically absorbed in the torque converter.

More recently, series type vibration damper assemblies have come into more prominent use for the lock-up clutches in torque converters and for friction clutches for manual transmissions to provide a relatively low rate, high amplitude deflection between the driving and driven means in the vehicle drive train. Such an assembly includes a hub operatively mounted on the transmission input shaft and having two or more radial arms, an input member in the form of a driving plate with tangs or a housing for the damper with inwardly offset drive straps, one or more floating equalizers having radial arms or floating skates guided by the periphery of the housing, and damper springs located between the hub arms and the arms or skates of the floating equalizers. This assembly will provide two or more groups of damper springs between adjacent hub arms acting in parallel with the springs in each group acting in series.

A graph of the deflection curve for the above described vibration damper assembly discloses a three stage curve with the slope of each stage of compression indicating a more rapidly increasing torque for the degrees of travel of the damper. This three stage curve will be present in either the drive or coast direction of travel for the damper. Also, as seen in U.S. Pat. No. 4,188,805, spring deflection limiting members are utilized as stops to limit the compression of certain damper springs during damper operation, but the three stage deflection curve will still be present.

When the damper changes from a drive mode to a coast mode, the inertia in the damper as it returns from the three stage deflection curve previously described to the coast direction causes an undesirable "slingshot" effect in the drive train which will be evident to the vehicle operator when the accelerator pedal is released. To minimize this effect, it is desirable to bypass two of the three damper springs in the series for each group. The present invention provides a solution to the problem of the undesirable inertia resulting from the change from drive to coast travel.

SUMMARY OF THE INVENTION

The present invention comprehends the provision of a vibration damper assembly having novel means to alter the deflection curve for the damper to react differently in the drive and coast directions. The damper assembly comprises two or more groups of damping springs acting in parallel, with each group consisting of three springs acting in series to provide a three stage deflection curve. The present invention provides a movement blockage means which will prevent compression of two adjacent springs in each group in the coast direction so that only one spring in the group is acted upon for deflection in the coast direction.

The present invention also comprehends the provision of a vibration damper assembly having a bypass thrust member on each radial hub arm that extends in one direction therefrom through two damper springs and the arm or skate of a floating equalizer to abut the arm or skate of the next adjacent equalizer. Thus, movement of the drive means in one direction will compress the first spring encompassing the bypass thrust member, the first equalizer arm or skate will move relative to the member to compress the second spring encompassing the member, which in turn will urge the second equalizer arm or skate away from the end of the member to compress the third damper spring. In the opposite direction of rotation, the drive means will compress the last mentioned third spring, but the equalizer arm or skate acted upon by the spring abuts the end of the bypass thrust member to block compression of the other two springs.

The present invention further comprehends the provision of a vibration damper assembly with the spring blocking bypass thrust member wherein the equalizer ring or skate can either provide a low lag or high lag frictional response, respectively, for friction damping in conjunction with the spring damping.

Further objects are to provide a construction of maximum simplicity, efficiency, economy and ease of operation, and such further objects, advantages and capabilities as will more fully appear and are inherently possessed thereby.

DESCRIPTION OF THE PREFERRED EMBODIMENTS

Figure 2:
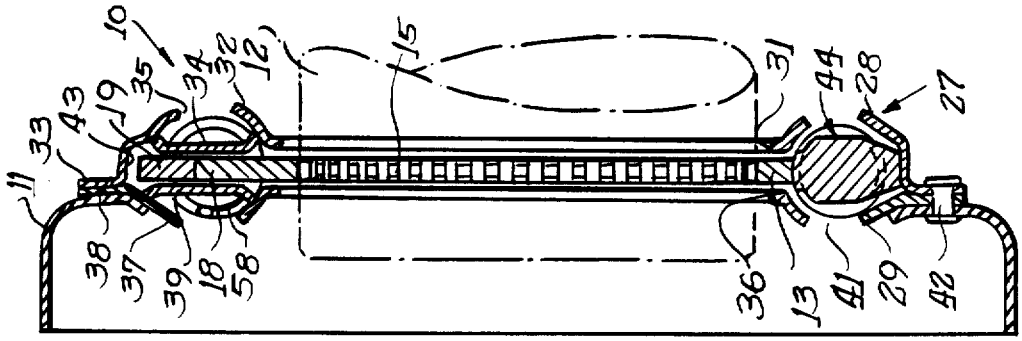
FIG. 2 is a cross sectional view of the damper assembly taken on the irregular line 2—2 of FIG. 1.
Figure 1:
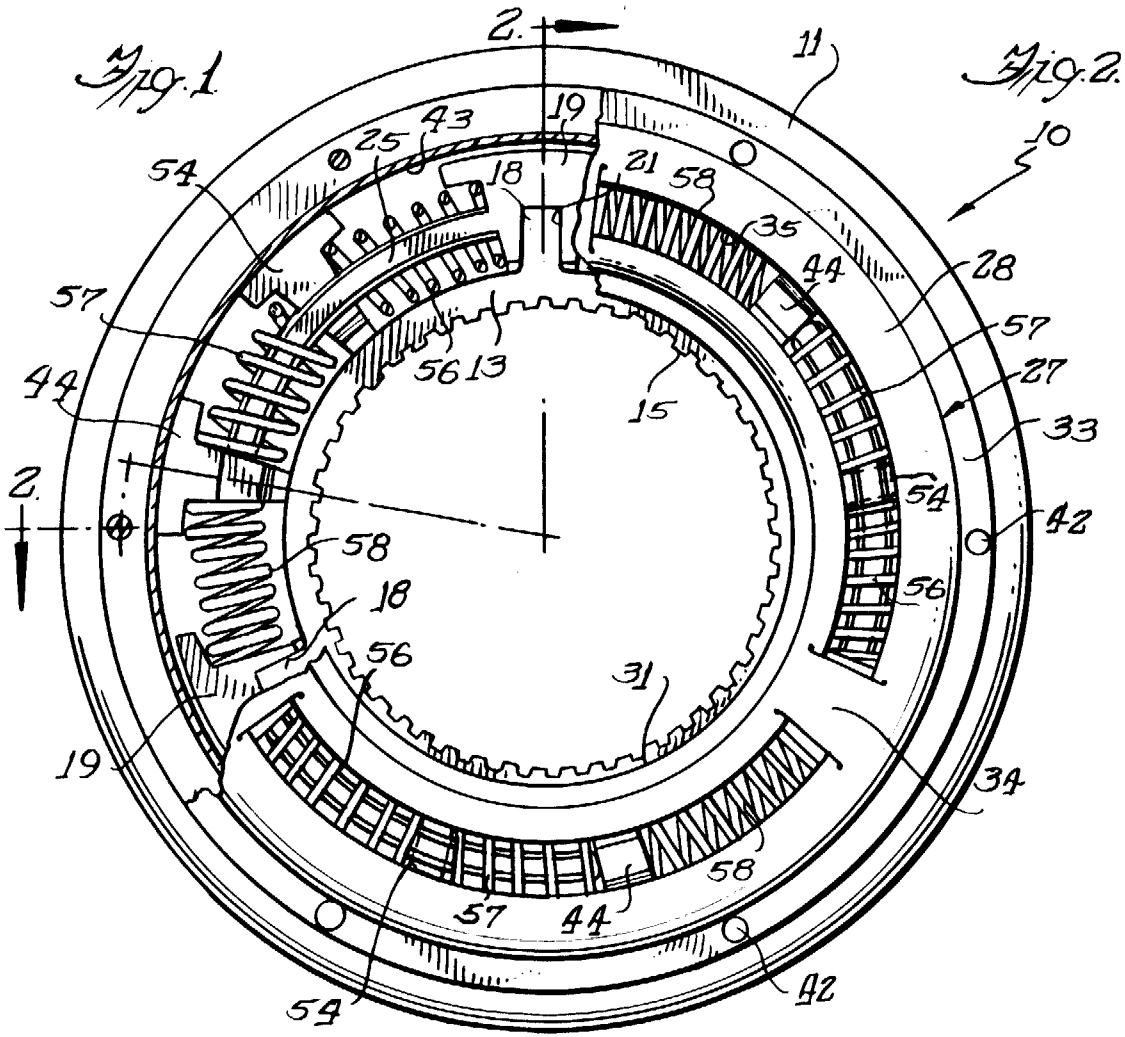
FIG. 1 is a rear elevational view with portions broken away of the vibration damper assembly of the present invention.

Referring more particularly to the disclosure in the drawings wherein are shown illustrative embodiments of the present invention, FIGS. 1 through 4 disclose a vibration damper assembly 10 having a similar construction to that shown in U.S. Pat. No. 4,279,132, wherein the damper assembly is operatively connected to a suitable torque input means 11 and acts to drive a torque output means 12, such as a transmission input shaft for either a manually-actuated or automatic transmission (not shown). The damper assembly includes a hub in the form of an annular ring or plate 13 with an internally splined central opening 15 to receive the externally splined end of the transmission input shaft 12. Three radially extending circumferentially equally spaced projections 18 are formed integral with the ring 13 and extend outward therefrom.

Mounted on each projection is a hub arm or friction lag plate 19 having a recess 21 receiving the projection 18 and outwardly diverging edges 22,22 terminating in an arcuate edge 23 with circumferentially oppositely extending fingers 24,24. Integral with the arm and extending from one edge 22 is a curved bypass thrust member 25 for a purpose to be later described. Also, as disclosed in my copending U.S. application Ser. No. 332,033, the use of the arms or lag plates 19, in conjunction with the projections 18, which have the outer arcuate edge 23 received in a channel 43 formed in the damper housing 27 provide frictional resistance to movement of the arms in the channel that is proportional to the centrifugal force on the mass of the arms 19 and the spring force resulting from engine rpm and torque.

The housing 27 consists of a pair of cover plates 28 and 29, the rear plate 28 having a central opening 31 concentric with the opening 15 in hub ring 13 and an outwardly bulged body portion 32 terminating in an outer offset radial flange 33. Stamped out of the body portion 32 are three inwardly offset drive straps 34 which parallel the hub arms 189 and fingers 18 in normal radial alignment therewith and separate three elongated arcute slots 35 formed in the bulged portion of the plate 28. The front cover plate 29 also has a central opening 36 generally axially aligned with opening 31 and an outwardly bulged body portion 37 terminating in an outer radial flange 38; the parallel flanges 33 and 38 having aligned openings to receive rivets 42 securing the flanges to the torque input means 11. Three inwardly offset drive straps 39 are stamped out of the body portion axially aligned with the straps 34 and separating elongated arcuate slots 41. A channel 43 is formed at the outer circumference of the cover plates and the offset for the flange 33 to receive the arcuate edge 23 of the hub arms and the outer edges of the skates 44 and 54.

Figures 3, 4, 5, 6, 7, 8, 9:
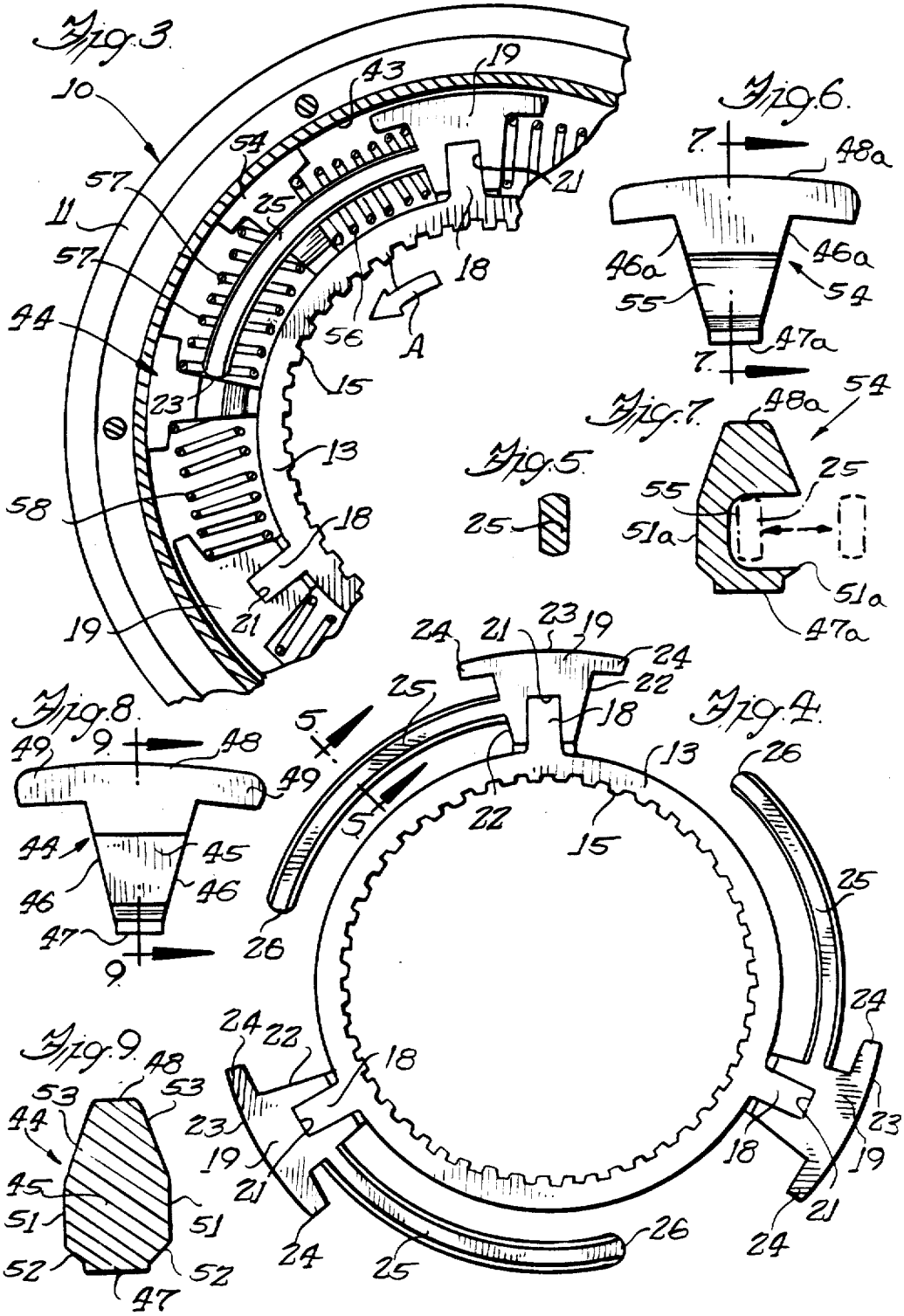
FIG. 3 is a partial rear elevational view with parts broken away showing one group of spring sets.
FIG. 4 is a rear elevational view of the damper hub and bypass thrust members.
FIG. 5 is a cross sectional view of the bypass thrust member taken on the line 5—5 of FIG. 4.
FIG. 6 is a rear elevational view of the sliding skate receiving the bypass thrust member.
FIG. 7 is a vertical cross sectional view taken on the line 7—7 of FIG. 6.
FIG. 8 is a rear elevational view of a solid sliding skate.
FIG. 9 is a vertical cross sectional view taken on the line 9—9 of FIG. 8.

The first skate or wedge 44 (FIGS. 8 and 9) has a solid body 45 with outwardly diverging sides 46,46 extending from a flat base 47 and terminating in a reduced width arcuate edge 48 having circumferentially oppositely extending fingers 49. In cross section as seen in FIG. 9, the skate has parallel surfaces 51,51 with converging lower surfaces 52,52 extending to the base 47 and converging upper surfaces 53,53 extending to the arcuate edge 48. The second skate 54 (FIGS. 6 and 7) between adjacent hub arms 19 also has diverging sides 46a from a flat base 47a to a reduced width arcuate edge 48a, however, a central passage 55 accommodating the bypass thrust member 25 extends through the body between the edges 46a and extends rearwardly to open into the rear surface 51a for ease of assembly.

Damper spring sets 56, 57, 58 are positioned between adjacent hub arms 19 and the skates 44 and 54 to form three groups of spring sets acting in parallel with the spring sets in each group acting in series. Each spring set may be one or more concentric compression springs. With the damper in the position shown in FIG. 1 where torque is not applied, the solid skate 44 abuts the rounded end 26 of the bypass thrust member 25 and the second skate 54 is positioned midway along the length of member 25 with the springs in their uncompressed skates; the arcuate edges 48 and 48a riding in the channel 43. Upon the application of torque to the housing 27 in the direction of the arrow A (FIG. 3), the pairs of drive straps 34,39 engage and compress the spring sets 56 which act on the skates 54 moving relative to the bypass thrust member 25 to compress the spring sets 57. The spring sets 57 act on the solid skates 44 to move them away from the ends 26 of members 25 to compress the spring sets 58 which act on the hub arms 19 to rotate the hub ring 13. Also, the centrifugal force of rotation of the hub and the action of the springs 56 and 58 on the diverging edges 22 of hub arms 19 act to urge the hub arms radially outwardly into the channel 43 in the housing 27 to offer resistance to movement of the hub relative to the housing.

Figure 10:
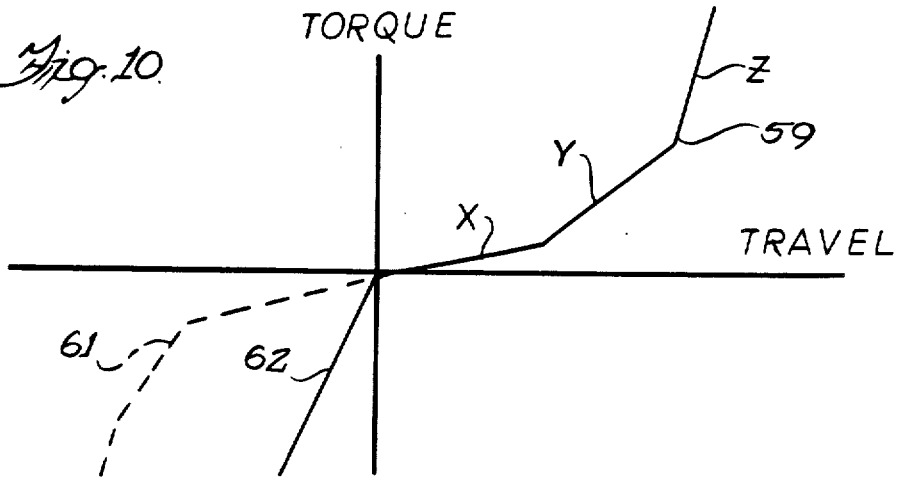
FIG. 10 is a graphic representation of the deflection curves for the damper with and without the addition of the thrust member.

The result of this damper action is graphically represented by the curve 59 in FIG. 10. As the first and then subsequent spring sets are brought into play the inclination of the curve changes from line X to line Y to line Z. In the absence of the bypass thrust member 25, when the operator releases the accelerator pedal the vehicle shifts from drive to coast mode with the spring sets 56, 57, 58 expanding and then being compressed in the opposite direction to result in the dotted line 61. However, with the bypass thrust member 25 added to the hub arms 19, when the damper shifts from the drive mode to the coast mode and the springs have expanded, then movement of the hub ring 13 and hub arms 19 compress the damper springs 58 against the skates 44, but movement of skates 44 to compress the springs 57 and movement of skates 55 to compress springs 56 is prohibited by the member 25. As the springs 58 are the only springs in the series that are compressed, the coast curve 62 is a straight line as shown in the graph. Obviously, the slope of line 62 can be adjusted depending on the spring characteristics.

Figure 11:
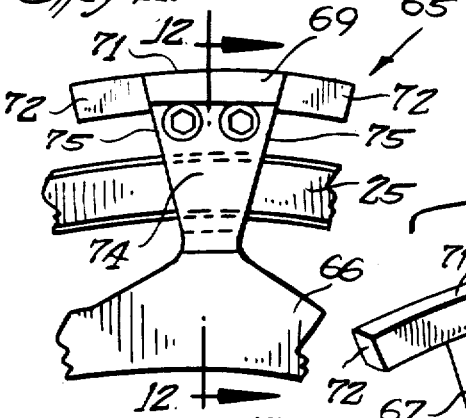
FIG. 11 is a rear elevational view of a portion of an equalizer ring and arm utilized in the damper assembly.
Figure 12:
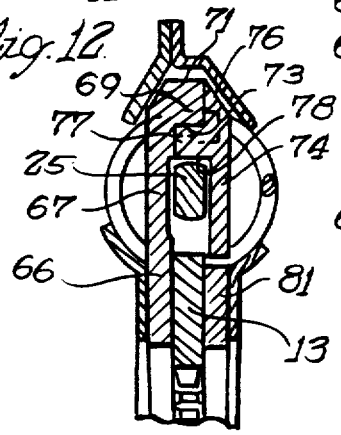
FIG. 12 is a vertical cross sectional view taken on the line 12—12 of FIG. 11.
Figure 13:
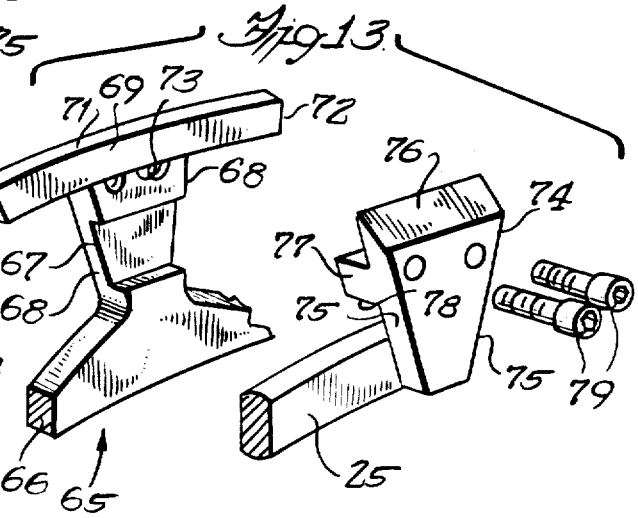
FIG. 13 is an exploded perspective view of an arm on the equalizer ring.

FIGS. 11 through 13 discloses an alternate embodiment of floating equalizer 65 of the ring type similar to that shown in U.S. Pat. No. 4,279,132. In this embodiment, the equalizer 65 comprises an annular ring 66 which is parallel to and adjacent the hub ring 13 and is provided with three circumferentially equally spaced equalizer arms 67, each arm having outwardly diverging edges 68 terminating in a rearwardly offset upper portion 69 providing the outer arcuate edge 71 with circumferentially oppositely extending fingers 72; the offset portion having a lower edge or shoulder 73 positioned over the bypass thrust member 25. A cover plate 74 also has outwardly diverging edges 75 extending upward to a tapered or chamfered upper edge 76 and has a forwardly extending rib 77 projecting under the shoulder 73 to form the upper surface 78 of the channel receiving the thrust member 25. A pair of openings in the cover plate are aligned with threaded openings in the arm 67 to receive cap screws 79 to retain the parts together and form an inverted U-shaped channel for the thrust member 25. This equalizer can be used in combination with a ring-type equalizer having inwardly offset arms as shown in U.S. Pat. No. 4,219,132 positioned on the side of the hub ring 13 opposite to the equalizer 65, or it can be used in combination with three of the solid skates 44 disclosed in the FIGS. 8 and 9. Where this equalizer ring 65 is utilized with a skate 44, a spacer ring 81 would be necessary on the opposite side of the hub ring 13 as seen in FIG. 12.

I claim:

1. A vibration damper assembly transmitting torque between driving and driven members and allowing different damping reactions in the opposite directions of rotation, comprising an input member operatively connected to torque input means, a hub operatively connected to torque output means and having at least two radial hub arms, a pair of floating spring separators between adjacent hub arms, compression spring sets interposed between said hub arms and separators forming groups of three spring sets acting in parallel with each group of spring sets acting in series, and a pair of cover plates substantially enclosing said hub, spring separators and spring sets and operatively connected to said input member, each cover plate having circumferentially equally spaced inwardly offset drive straps interposed in the path of the spring sets and corresponding in number to and normally axially aligned with said hub arms, the improvement comprising a curved bypass thrust member operatively connected to each hub arm and extending in one direction through a pair of adjacent spring sets and the spring separator therebetween.

2. A vibration damper assembly as set forth in claim 1, wherein said bypass thrust member extends through two adjacent spring sets to abut the next adjacent spring separator when the damper is in unloaded condition.

3. A vibration damper assembly as set forth in claim 2, wherein at least one of each pair of spring separators comprises a generally wedge-shaped sliding skate, and said cover plates define an outer channel receiving the outer edge of the skate.

4. A vibration damper assembly as set forth in claim 3, in which said skate abuts said bypass thrust member in the normal position.

5. A vibration damper assembly as set forth in claim 4, in which a spring set is interposed between said skate and an adjacent hub arm, said skate having a wedge-shaped body with a flat base sliding on said hub flange and terminating in an arcuate circumferentially extending outer edge received in said channel.

6. A vibration damper assembly as set forth in claim 5, in which torque applied through said drive straps causes a series engagement of said spring sets and spring separators to drive the hub, and torque applied from the hub in the coast direction compresses one damper spring set of each group against the skate abutting the bypass thrust member; the thrust member preventing compression of the other two spring sets in each group.

7. A vibration damper assembly as set forth in claim 2, wherein all of said spring separators comprise generally wedge-shaped sliding skates, each pair of skates including a solid skate abutting the end of said bypass thrust member and the other skate having a central passage therethrough receiving said bypass thrust member and movable relative thereto.

8. A vibration damper assembly as set forth in claim 2, wherein an equalizer ring is concentric with said hub and has radial equalizer arms extending therefrom and conforming in number to the hub arms, each equalizer arm forming one of the pair of spring separators between adjacent hub arms, the other separator of each pair being a generally wedge-shaped sliding skate.

9. A vibration damper assembly as set forth in claim 7, in which each skate is solid so as to abut the end of said bypass thrust member, and each equalizer arm has an inverted generally U-shaped channel extending therethrough receiving said bypass thrust member.

10. A vibration damper assembly as set forth in claim 9, in which each said equalizer arm comprises an arm portion forming part of the channel and a cover plate secured to the arm portion to form the remainder of the channel, said arm portion and cover plate having interengaging shoulders to rigidly retain the parts together.

11. A vibration damper assembly as set forth in claim 1, wherein said hub includes an annular ring with at least two radial projections circumferentially equally spaced thereon, and each hub arm includes a recess conformably receiving said projection, each bypass thrust member being integral with its associated hub arm.

12. A vibration damper assembly as set forth in claim 11, wherein each hub arm includes a base having the recess therein, a pair of outwardly diverging edges, and an arcuate circumferentially extending outer edge, said bypass thrust member extending from one of the diverging edges.

*13. A vibration damper assembly transmitting torque between driving and driven members and allowing different damping reactions in the opposite directions of rotation, comprising an input member operatively connected to torque input means, a hub operatively connected to torque output means and having at least two radial hub arms, at least one floating spring separator between adjacent hub arms, compression spring sets interposed between said hub arms and separators forming groups of at least two spring sets acting in parallel with each group of spring sets acting in series, and a pair of cover plates substantially enclosing said hub, spring separators and spring sets and operatively connected to said input member, each cover plate having circumferentially equally spaced inwardly offset drive straps interposed in the path of the spring sets and corresponding in number to and normally axially aligned with said hub arms, the improvement comprising a curved bypass thrust member operatively connected to each hub arm and extending in one direction through at least one spring set to abut a spring separator.*

*14. A vibration damper assembly as set forth in claim 13, in which said separators are generally wedge-shaped sliding skates abutting said bypass thrust member.*

*15. A vibration damper assembly as set forth in claim 13, in which said spring separators are radial arms on an annular equilizer ring.*

*16. A vibration damper assembly as set forth in claim 13, wherein each hub arm includes a pair of outwardly diverging edges, said bypass thrust member extending from one of said edges.*

*17. A vibration damper assembly as set forth in claim 13, wherein said cover plates define an outer channel receiving the outer edge of each said spring separator.*

*18. A vibration damper assembly as set forth in claim 13, in which torque applied through said drive straps causes a series engagement of said spring sets and spring separators to drive the hub, and torque applied from said hub in the coast direction compresses one damper spring of each group against the separator abutting the bypass thrust member; the thrust member preventing compression of the other spring set in each group.*

* * * * *